United States Patent
Lowell

[11] 3,912,365
[45] Oct. 14, 1975

[54] METHOD AND APPARATUS FOR MAINTAINING THE SEPARATION OF PLATES

[75] Inventor: Francis C. Lowell, Huntington Station, N.Y.

[73] Assignee: Research Frontiers, Incorporated, Plainview, N.Y.

[22] Filed: June 4, 1973

[21] Appl. No.: 366,463

Related U.S. Application Data

[62] Division of Ser. No. 166,038, July 26, 1971, Pat. No. 3,742,600.

[52] U.S. Cl. ...... 350/160 R; 350/160 LC; 350/312; 156/104
[51] Int. Cl.² ............................................. G02B 5/23
[58] Field of Search ...... 350/160 LC, 160 R, 160 P, 350/312; 156/104

[56] References Cited
UNITED STATES PATENTS

| | | | |
|---|---|---|---|
| 3,399,294 | 8/1968 | Thieben | 52/616 X |
| 3,592,526 | 7/1971 | Dreyer | 350/159 |

FOREIGN PATENTS OR APPLICATIONS

| | | | |
|---|---|---|---|
| 1,208,891 | 10/1970 | United Kingdom | G 4 N/2 F |

*Primary Examiner*—Ronald L. Wibert
*Assistant Examiner*—Paul K. Godwin
*Attorney, Agent, or Firm*—Stephen E. Feldman

[57] ABSTRACT

A method and apparatus are disclosed for maintaining a predetermined separation between the walls of light valves, especially when the pressure on the inside of the walls may be less than the pressure on the outside of the same walls (atmospheric pressure). To maintain this separation, a plurality of small chemically inert, non-deformable beads are added to the fluid suspension in the light valve. These beads which have at least one dimension which is the same as the desired spacing between the walls distribute themselves throughout the suspension to prevent the pressure differential from causing the walls to come closer together than the predetermined distance between them and thereby help to assure the proper operation of the light valve.

14 Claims, 2 Drawing Figures

METHOD AND APPARATUS FOR MAINTAINING THE SEPARATION OF PLATES

This is a division, of application Ser. No. 166,038, filed July 26, 1971 now U.S. Pat. No. 3,742,600.

BACKGROUND OF THE INVENTION

This invention refers to thin panels and especially to light valves of the type in which a fluid suspension of particles is confined in a space between two transparent plates of glass, plastic or similar material. In light valves of this type, electrically conductive transparent coatings are applied either to the inside or outside surfaces of the plates so that an electrical potential can be applied to the suspension in the space between the plates in order to activate and operate the light valve. In many applications, for example, where the light valve is used as a window in a building or as a shutter in a camera, the panel is used in a vertical position. When this vertical dimension is large, for example, 6 to 12 inches or larger, the hydrostatic pressure of the liquid suspension causes the fluid to press outward on the plates and bows these plates into a curved surface. To overcome this, the method disclosed in U.S. patent application Ser. No. 166,014, entitled Method for Controlling Bowing in Light Valves by Forlini et al., and assigned to the assignee of the present invention is used. As mentioned in that application, in order to eliminate the bowing, the pressure inside the cell of the light valve is reduced, by removing fluid, so that it is equal to or less than the pressure on the outside of the light valve. When this is done, the pressure at some points may be lower on the inside than on the outside of the light valve. If carried far enough this can cause a reverse (inward) bowing to take place. This bowing can lead to distortion in transmission of the panel and even more serious, to the conductive coatings of the light valve coming into contact with each other and electrically shorting out the valve. This inward bowing can also be caused by many other forces. For example, when a light valve is used as a window, wind or differences in pressure between the inside and outside of the building can cause the same inward bowing effect. The object of this invention is then to maintain the predetermined separation between the walls in light valves to prevent any such inward bowing and also to reinforce the panels so the entire light valve is substantially stronger.

SUMMARY OF THE INVENTION

A plurality of small, inert, substantially rigid and/or non-deformable beads (bodies) are added to the fluid suspension in a light valve. These beads distribute themselves throughout the suspension and thereby prevent outside forces from causing the panel walls to come any closer to each other than a desired distance which is the smallest dimension of these beads.

PREFERRED EMBODIMENT OF THE INVENTION

Figure 1:
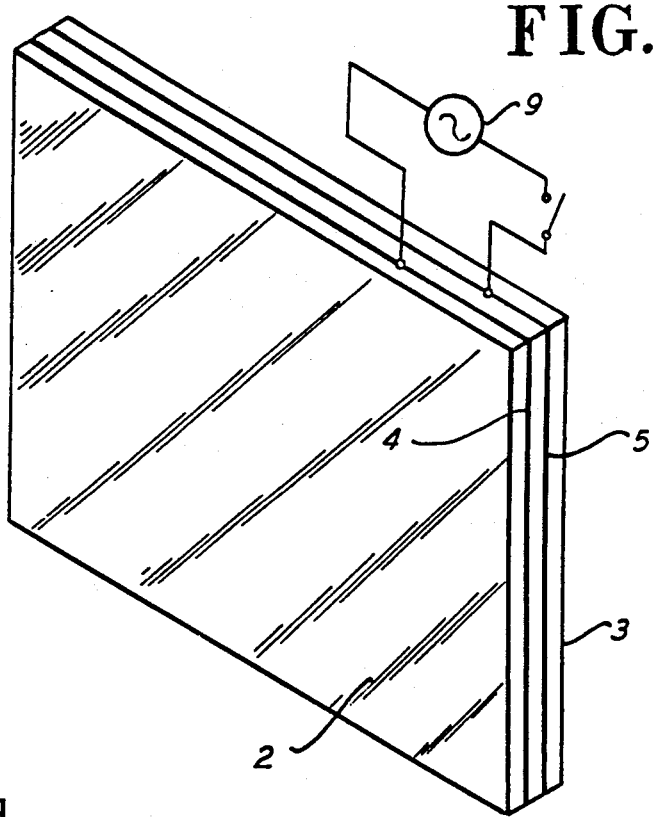
FIG. 1 illustrates a perspective view of a light valve having the small particles of this invention therein.
Figure 2:
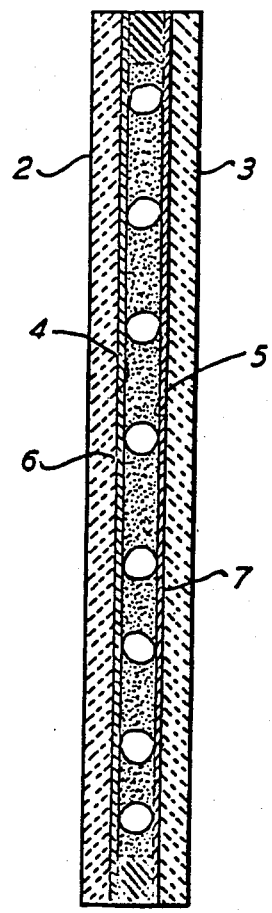
FIG. 2 is an enlarged partial, cross-sectional view of FIG. 1 showing the positioning of the particles.

In FIGS. 1 and 2 are shown a typical light valve employing this invention. The light valve consists of two transparent plates 2 and 3 which are preferably constructed of plastic, glass or other strong transparent material. These plates are generally parallel or substantially parallel and are sealed around the periphery to create an enclosed cell. The cell is filled with a fluid suspension, which has particles therein which can have their orientation changed on the application of an electric or magnetic field to the suspension. This will be discussed in greater detail hereinafter.

On the inner surfaces of the panels, surfaces 4 and 5, a thin, transparent, electrically conductive coating, designated by numerals 6 and 7 is applied. These coatings are connected by suitable electrical connections to a source of energy, such as voltage source 9, preferably an AC source. Alternatively, the conductive coatings may be placed on the outside of the panels or may be placed on the inside and covered with a protective coating. This is discussed in more detail in U.S. patent application Ser. No. 25,541, entitled "Light Valve with Flowing Fluid Suspension" and assigned to the assignee of the present Application.

The suspension itself consists of particles of a substance such as herapathite suspended in a carrier such as isopentyl acetate. The particles are such that they are capable of having their orientation changed on the application of an electric or magnetic field. Before the application of a field across the suspension, the suspension will appear almost opaque since the particles are not aligned. However, when a voltage field is applied across it, the particles become aligned so that the suspension will appear transparent and light will be capable of being transmitted therethrough. When the field is removed, Brownian movement will cause disorientation of the particles so that the suspension will become very dark, almost opaque, and prevent the transmission of light therethrough. The aforementioned use of herapathite and its response is mentioned in the last mentioned U.S. patent application, Ser. No. 25,541.

However, one of the significant problems with these light valves and the problem to which this application is directed, is the problem of making light valves having large dimensions, especially when they are intended to be used in a vertical orientation. The problem is that the pressure of the liquid suspension in the valve causes an outward bowing of the transparent panels and a distortion of the transmission through the valve. This hydrostatic pressure bowing can be eliminated as described in the aforementioned U.S. patent application, Ser. No. 166,014. However, it is very important that when the pressure is reduced inside the light valve, in accordance with the method of this Application, that if the pressure at any point inside the cell is reduced to a point where it is less than the outside atmospheric pressure that any possibility of reverse (inward bowing) due to the difference in pressure be prevented. If there is any such reverse bowing, it is very important that it be corrected since, if it remains, there may be distortion effects similar to those that appear on outward bowing. Also, as aforementioned, inward bowing can also cause the conductive coatings to contact each other and short circuit the cell.

Briefly describing the method or reducing pressure, as stated in the aforementioned Application. The cell is first filled with the fluid suspension completely so that there are no bubbles of air in the cell. To fill the cell, one method that can be used is to employ an extending tube on top of the cell. Once the cell has been completely filled with fluid suspension through the aforesaid tube, a suction apparatus such as a hypodermic syringe is connected to the filling tube. A small amount of fluid is removed or the pressure is otherwise reduced until the pressure inside the valve is substantially the same as the pressure outside the valve and the bowing is thereby completely eliminated and the cell walls become flat and parallel. The suction apparatus is then removed, the filling tube is crimped so as to prevent any air from entering the apparatus which now has a pressure inside substantially the same at at least one point as the corresponding pressure at the same point on the outside of the panel. The problem is that this method could lead to places inside the panel where the pressure is less than the pressure on the outside of the cell at the corresponding places. This could result in the undesirable inward bowing effect aforementioned.

Now, in accordance with this invention, to overcome this effect, small, substantially rigid or non-deformable beads, bits of material or other similar bodies are placed between the walls in the cell. These beads, as shown in FIG. 2, are preferably made of a hard plastic such as polycarbonate or polymethyl methacrylate, and are curved and are of a generally round or ovoid shape with one dimension being the same as the desired spacing between the panel walls (plates). The beads should also be inert with respect to the entire light valve, including the fluid suspension, the panel walls and the conductive coatings. It is especially important that they be electrically nonconductive, since if they were electrically conductive, they could provide a short circuit between the conductive coatings and distort the proper operation of the light valve. It will be appreciated that the beads can have any desired optical properties, i.e. they can be opaque, translucent or transparent and be of any color. The rounded edges on the beads are provided so that they can more readily adjust to the proper orientation between the panels. However, they can be of many other shapes. This will be discussed in more detail hereinafter.

The beads are placed in position by being mixed into the suspension before it is added to the light valve. They are mixed into the suspension by a slight stirring action so they become equally distributed throughout the suspension. Their mass density (or specific gravity) should preferably be sufficiently close to the density of the fluid suspension so that they tend to remain well distributed in the suspension without settling for at least a short amount of time after being stirred or mixed into the suspension. They are normally placed in the panel by being poured into the cell in a mixed condition with the fluid suspension. Thus, as the fluid suspension is poured into the cell, these small beads are distributed throughout the cell. The cell, at this point, is vertically positioned and completely sealed except for the opening through which the fluid suspension is poured in. A suction device (in accordance with the process of the aforementioned patent application) is now attached to the tube and a small amount of fluid is withdrawn until the bowing of the walls of the cell is eliminated. The walls are then flat and parallel with respect to one another, as they were originally before the fluid was added. At this point, the pressure of the fluid inside the cell has preferably been reduced to the point where it is less at many points than the pressure of the atmosphere at the corresponding points outside the cell. This would ordinarily cause the walls as aforementioned, to possibly bow inwardly to some extent. However, since the beads are present between the panel walls, and have at least one dimension which is approximately the same or slightly smaller than the desired space between the panel walls, the beads will prevent any significant inward bowing of the walls.

The beads may have curved surfaces as aforementioned. This permits them to move around so that they can be properly aligned between the walls as the walls are being drawn inward by the pressure change. If a bead has one dimension that is longer than the desired spacing between the panels, the rounded edges of the bead will cause it to rotate so that its shorter dimension is properly positioned between the walls. Because of this, perfectly spherical beads of course are especially desirable. Also, by having curved surfaces and by being free to move around, the beads can move to the point where they will be most optimally aligned and therefore capable of properly holding the plates the correct distance apart. A typical dimension for the spacing between the cell walls is 30 mils and therefore the beads for use with that cell will have one dimension of about 30 mils. As the gap between the cell walls increases or decreases the dimensions of the beads will correspondingly increase or decrease.

The beads will not only prevent the glass walls (plates) of the panel from contacting each other, but they will also substantially strengthen the entire light valve structure since they will be held firmly in position due to the inward pressure exerted against them by each major wall. This pressure is caused by the slightly greater pressure on the outside of the cell walls than on the inside. The beads will now, in essence, form an interlocking structure so that the walls and the beads will make up an entire lattice structure to substantially strengthen the light valve. This strengthening is especially significant when the panels are very large and exposed to the atmosphere since it will strengthen the panels to the point where they can withstand substantial wind or other forces that each plate or panel may be subjected to. With wind and other external forces that are perpendicular or substantially perpendicular to the panel faces, the strengthening will be important since there is very little strength in the perpendicular direction in a conventional glass panel containing a fluid suspension. With these beads which are now an integral part of the structure, the strengthened panel will now have a strength substantially in excess of the two separate glass plates by themselves.

As an example, a panel was constructed 5 feet high by 3 feet wide, and a negative pressure of about 0.2 atmosphere was then created inside the panel near the top of the panel. Tiny, non-deformable plastic beads having a flat rectangular shape were used. The result was a cell five feet high having a suspension therein without any significant inward bowing, and therefore, having a substantially uniform suspension of approximately constant thickness.

Briefly, when it is desired to reduce the outward bowing in a light valve, the valve is initially filled with a fluid suspension having rigid or non-deformable beads therein, which distribute themselves throughout the panel. The pressure in the panel is then reduced by withdrawing some of the fluid under suction conditions. The panel is then sealed hermetically. This causes the major walls of the panel to press inwardly against the beads. The beads thereby maintain the proper cell separation and also substantially strengthen the entire light valve.

This invention is also useful when the suspending fluid in the panel is a gas. Without the use of the beads, the walls of a sealed panel filled with gas will bulge inward and outward as the barometric pressure changes. When the barometric pressure (the atmospheric pressure outside the panel) decreases so that it becomes less than the pressure of the gas sealed within the panel, the walls will bulge outward. When the barometric pressure increases so that it becomes greater than the pressure of the gas sealed inside, the walls will bulge inward. The panel thus acts like the sensing element of an aneroid barometer.

This will also occur with changes in the temperature of the panel. When the panel temperature rises, as for example, when the panel is used as a window in the wall of a building facing the sun, the pressure of the gas sealed in the cell will increase, and the walls will bulge outward. When the panel temperature drops, as for example, when the aforesaid window is exposed to cold air in the shade, the gas pressure in the cell will drop, and the walls will bow inward toward each other.

Thus, the spacing between the walls of a gas-filled panel is quite sensitive to variations in ambient temperature and pressure, without the benefit of this invention. However, this sensitivity is eliminated by means of this invention thus: — the panel is filled with the specified beads and with the gas at a pressure low enough so that the gas pressure inside the panel is always below ambient atmospheric pressure throughout the range of ambient pressure in which the window will be used, and throughout the range of temperature at which the panel will be used. The walls are therefore always subject to a net force tending to bring the walls together, and the walls are always kept at their proper spacing from each other by beads that are clamped between the walls.

The optical density of the beads does not vary as does the optical density of the suspension. Consequently, the beads are visible at least some of the time during which the optical density of the suspension is varied. However, this visibility of the beads can be minimized in a selected range of optical densities of the suspension by one or more of the following three methods: (1) the beads can be chosen to have an optical density approximately equal to the optical density of the suspension in the range of optical densities in which it is desired to minimize the visibility of the beads; (2) the color of the beads can be chosen to match approximately the color of the suspension; and (3) the index of refraction of the beads can be chosen to match approximately the index of refraction of the suspension.

In some applications of the light valve it is desirable to minimize the number of beads in the valve because of the possible visibility of the beads. On the other hand, the number of beads, and their placement, must be sufficient to prevent the bowing of the plates as described elsewhere herein. The number of beads required for this purpose depends upon the thickness of the elastic constants of the beads, and upon the size and shape of the panel. As a general rule-of-thumb, for example, with glass plates that are 3/16 inches thick, one bead for every 4 square inches of panel suffices.

The term "fluid" includes but is not limited to fluid suspensions.

It will be appreciated that this invention provides a highly efficient way of strengthening a light valve and for preventing inward bowing.

While specific embodiments of my invention have been illustrated, it will be appreciated that the invention is not limited thereto, since many modifications may be made by one skilled in the art which fall within the true spirit and scope of the invention.

I claim:

1. Apparatus for maintaining the proper separation between the walls of a cell, said walls being in a substantially vertical position containing a liquid comprising:
    small non-reactive bodies positioned between the walls of the cell and having a dimension substantially equal to the desired separation between the walls, and surrounded by liquid,
    pressure means due to a differential pressure across a wall of the cell which applies a force to the wall of the cell in the direction of the other wall so that the body is held between the two walls and the desired separation is maintained therebetween.

2. The device of claim 1 wherein the means for applying a force to one wall also applies a force to the other wall which is equal and opposite to the first force and wherein these forces hold the bodies between the walls.

3. The device of claim 2 wherein the forces are caused by the pressure of the fluid in the cell being less at a point in the cell than the pressure of the fluid at the corresponding point outside the walls.

4. The device of claim 3 including suction means for removing some fluid from the cell to cause the reduced pressure therein.

5. Apparatus for maintaining the proper separation between the walls containing a fluid comprising:
    small non-reactive bodies positioned between the walls of the cell and having a dimension substantially equal to the desired separation between the walls, and surrounded by fluid,
    means for applying a force to a wall of the cell in the direction of the other wall so that the body is held between the two walls so that the desired separation is maintained therebetween,
    the means for applying a force to one wall also applies a force to the other wall which is equal and opposite to the first force and wherein these forces hold the bodies between the walls, the forces are caused by the pressure of the fluid in the cell being less at a point in the cell than the pressure of the fluid at the corresponding point outside the walls,
    suction means for removing some fluid from the cell to cause the reduced pressure therein, and
    wherein the fluid is a fluid suspension containing particles which are capable of having their orientation changed to affect radiation passing through the cell upon the application of an electric or magnetic field to the cell.

6. The device of claim 5 wherein the walls are coated with an electrically conductive coating for placing the field across the fluid suspension.

7. The device of claim 6 wherein the fluid suspension is a suspension of herapathite.

8. A unit comprising two spaced sheets of light transmitting material which are in a substantially vertical position containing a liquid between them, the sheets being joined together as a unit with spacer means between the sheets to hold them apart, and the pressure within the unit at the upper level of liquid being reduced below atmospheric pressure so that the liquid at or about its lowest level in the unit does not exert an outward pressure on the sheets greater than atmospheric pressure.

9. A unit according to claim 8 in which the pressure is reduced to a level such that the liquid at the bottom of the unit exerts a pressure of less than atmospheric pressure on the sheets.

10. A unit according to claim 8 in which the two sheets are joined as a unit around their edges except for a passage therethrough for use in reducing the pressure within the unit.

11. A unit according to claim 8 in which the liquid has variable light transmission characteristics.

12. A unit according to claim 11 in which the light transmission can be varied by electrical potential applied across the liquid.

13. A unit according to claim 12 in which the light transmitting sheets are provided with electrically conducting surfaces.

14. A unit according to claim 13 in which the spacer means are electrically insulating.

* * * * *